Feb. 1, 1938.  R. C. MILLER  2,106,985
AEROPLANE SEAT STRUCTURE
Filed July 1, 1936  3 Sheets-Sheet 1
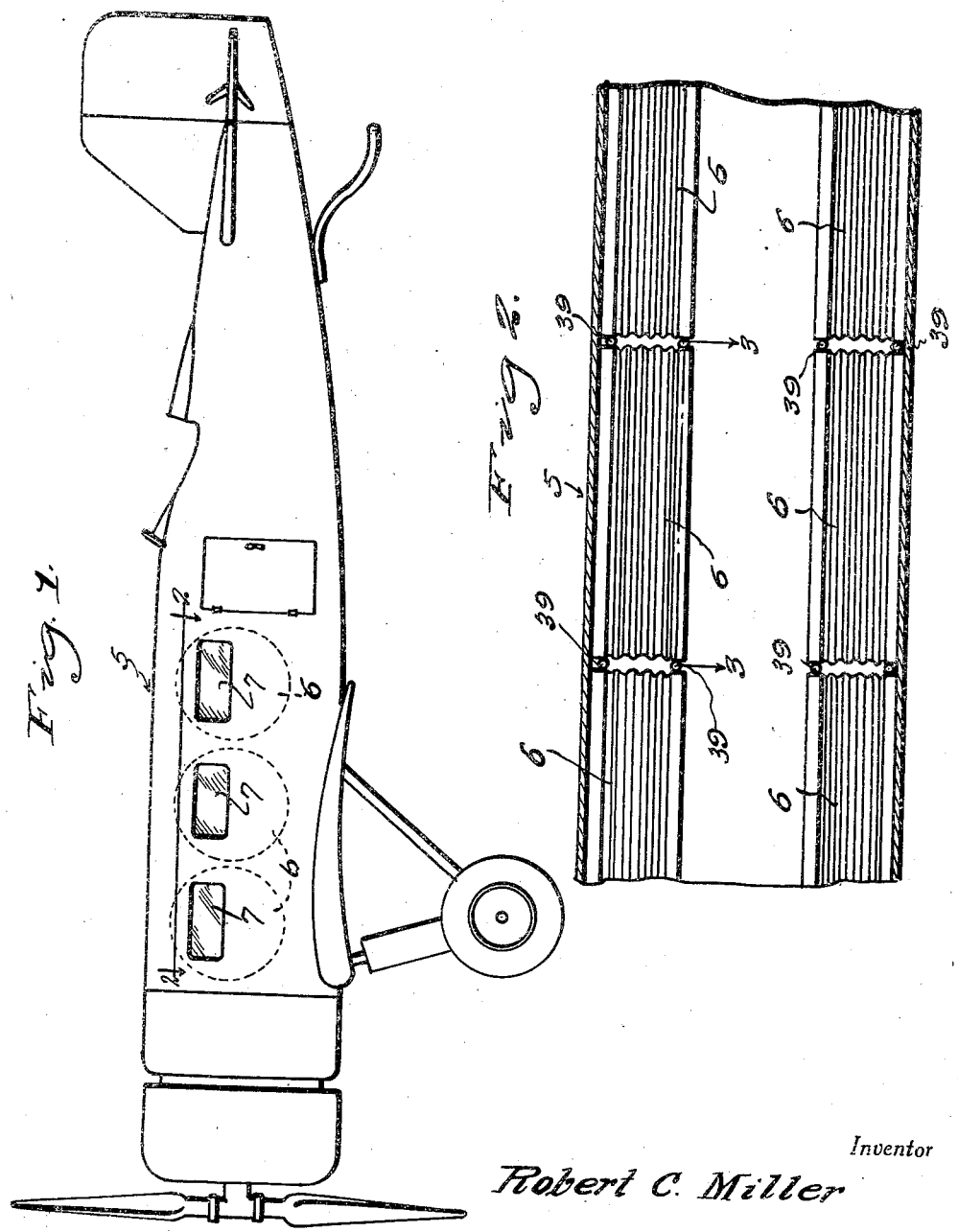
Inventor
Robert C. Miller
By Clarence A. O'Brien
Hyman Berman
Attorneys Feb. 1, 1938.　　　　R. C. MILLER　　　　2,106,985
AEROPLANE SEAT STRUCTURE
Filed July 1, 1936　　　3 Sheets-Sheet 2
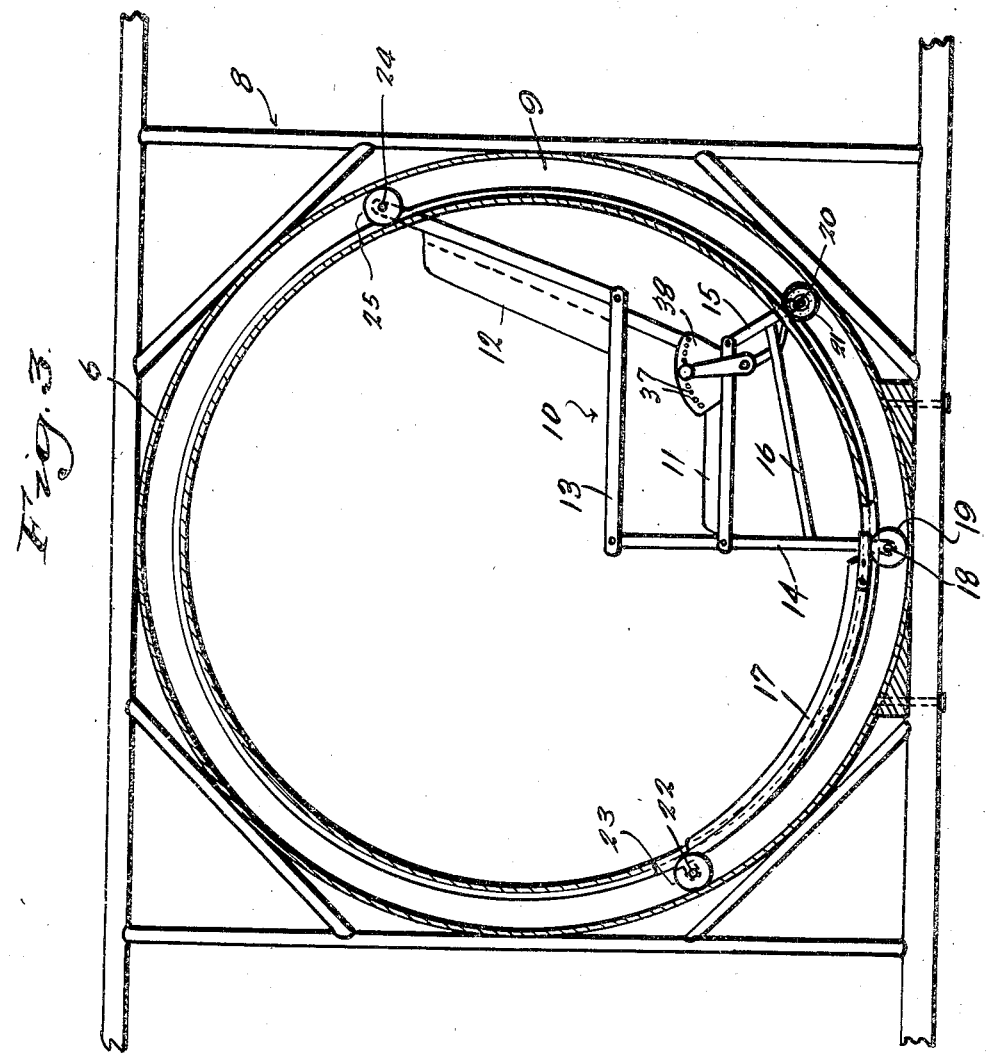
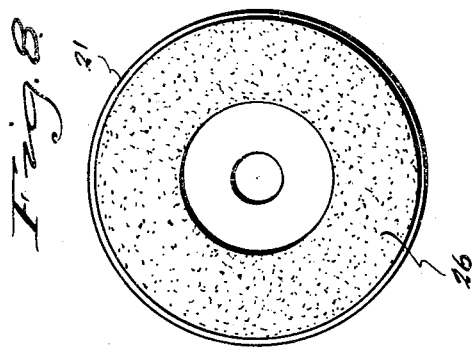
Inventor
*Robert C. Miller*
By *Clarence A. O'Brien*
*Hyman Berman*
Attorneys

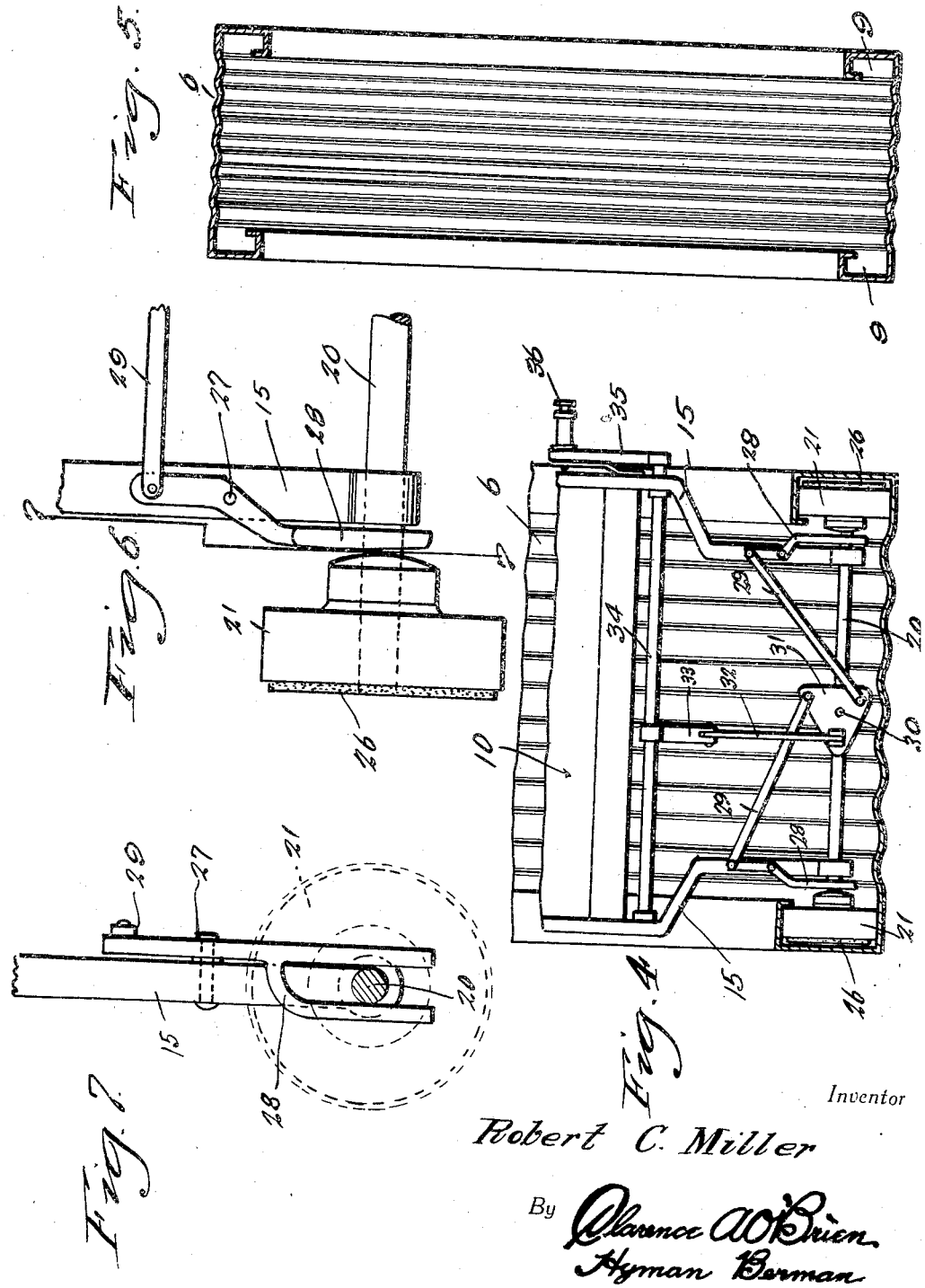

Patented Feb. 1, 1938

2,106,985

UNITED STATES PATENT OFFICE 2,106,985

AEROPLANE SEAT STRUCTURE

Robert C. Miller, Uniontown, Pa.

Application July 1, 1936, Serial No. 88,483

3 Claims. (Cl. 244—122)

This invention relates broadly to aeroplanes and more particularly to a seat construction for aeroplanes.

An object of the present invention is to provide a seat construction of such a character that in the event of an accident to the aeroplane the impact of the crash would be greatly lessened as far as the occupants of the aeroplane are concerned.

The invention together with its objects and advantages will be best understood from a study of the following description taken in connection with the accompanying drawings wherein:—

Figure 1 is a side elevational view of an aeroplane embodying the features of the present invention.

Figure 2 is a sectional view taken substantially on the line 2—2 of Figure 1.

Figure 3 is a detail sectional view taken substantially on the line 3—3 of Figure 2.

Figure 4 is an enlarged detail sectional elevational view illustrating certain details hereinafter more fully referred to.

Figure 5 is a sectional view through a cylinder forming part of the invention.

Figure 6 is a detail elevational view of a brake structure and wheel assembly forming part of the invention.

Figure 7 is a detail sectional view taken substantially on the line 7—7 of Figure 6, and Figure 8 is a side elevational view of a wheel or roller forming part of the invention.

Referring to the drawings by reference numerals it will be seen that in accordance with the present invention there is provided at each side of the cabin part of an aeroplane, herein designated by the reference numeral 5, a series of cylinders 6, each of which is suitably secured in position opposite a window 7 through the medium of a suitable retaining frame assembly indicated generally by the reference numeral 8.

Each cylinder 6 is preferably formed of corrugated metal or the like and is opened at its respective opposite sides. At said sides the wall of the cylinder is formed so as to provide continuous channels or guide rails 9.

Arranged within each cylinder 6 is a seat indicated generally by the reference numeral 10. The seat 10 includes a seat portion 11, a back 12, arms 13, fore-legs 14, and rear or hind legs 15, the legs 14 and 15 being braced with respect to each other as at 16.

Also extending forwardly from the legs 14 is an arcuate foot rest 17.

Journaled between the lower ends of the legs 14 is a shaft 18 provided with rollers or wheels 19 that ride in the track channels 9.

Extending between and suitably secured in any manner to the lower ends of the rear legs 15 is a fixed axle 20 on the ends of which are wheels or rollers 21 mounted to rotate relative to the axle 20 and also to shift longitudinally on the axle.

Also provided at the free ends of the foot rest 17 and extending transversely of the foot rest is an axle 22 on the ends of which are rollers 23 which like the rollers 19 and 21 operate in the channel tracks 9.

The back 12 of the seat also has a frame part extended beyond the padding of the back 12 and suitably provided in the extended part of the back frame is an axle 24 equipped at its respective opposite ends with wheels or rollers 25 that also operate in the channel guides or tracks 9.

It will thus be seen that the chair 10 is so mounted within the tube as to move relative thereto with the result that the chair will substantially at all times remain in an upright position regardless of the shock to which the aeroplane may be subjected in the event of a crash. Thus the possibility of the occupant of the chair being dislodged with the possibility of incurring injury is reduced to a minimum.

For securing the chair 10 in a somewhat stationary position there are provided on the outer sides of the wheels or rollers 21 disks 26 of asbestos or other material suitable to provide a braking surface.

Also pivoted on each leg 15 of a chair 10 as at 27 is the shank of a fork 28 which straddles the axle 20 and is arranged to engage the adjacent wheel or roller 21 for shifting the latter relative to the axle 20 to bring the braking surface 26 into frictional engagement with the adjacent wall of the channel guide or track 9 for applying a braking action to the wheels 21 in a manner serving to retain the chair in a more or less fixed position within the tube 6.

The shanks of the fork 28, associated with each chair, are connected through the medium of links 29 with a lever plate 30 pivoted as at 31 on the axle 20 as best shown in Figure 4. The plate 30 is in turn operatively connected through the medium of a link 32 with an arm 33 provided on a rod 34 suitably journaled between the aforementioned legs 15. On one end of the shaft 34 is a crank 35 which is equipped with a push and pull pin 36 adapted to engage a selected opening of a series of openings 37 provided in a segmental plate 38 suitably mounted at one side of the seat 11 of the chair 10 as will be clear from a study of Figures 3 and 4.

By placing the pin 36 in the proper one of the openings 37 the pressure of the forks 28 on the wheels 21 will be regulated to provide a braking action between the brake sections 26 on wheels 21 and the adjacent walls of the guide channels 9 as will be sufficient for holding the chair substantially in a relatively fixed position against too free movement, and as will be required by the weight of the occupant of the chair. In other words it will be appreciated that the weight of the occupant of the chair will determine approximately the amount of braking pressure required for holding the chair against too free movement within the tube and while occupied.

Also, and as will be found desirable in practice, there may be interposed between the tubes 6 cushioning elements 39 of rubber, cork, or other resilient material.

From the above it will be appreciated that in the event of a wreck the chair or seat will so shift within the tube 6 as to preclude the possibility of the occupant of the chair being forcibly ejected therefrom with the result that the likelihood of injury to the occupant seated will be greatly lessened in the event of a crash and whether the plane be upright, or on its side, or at an angle to the perpendicular, or in an inverted position.

It is thought that a clear understanding of the construction, utility and advantages of an invention of this character will be had without a more detailed description.

Having thus described the invention what is claimed as new is:—

1. In a device of the character described, a relatively fixed vertically disposed annular cylinder opened at each end and provided at opposite sides thereof with vertically disposed annular guide rails, a chair arranged in said cylinder and provided with rollers engaging the guide rails, certain of said rollers being shiftable laterally relative to the chair and provided on one side thereof with braking surfaces for engaging the guide rails in a manner to apply a braking action to the chair.

2. In a device of the character described, a relatively fixed vertically disposed cylinder provided concentrically of the sides thereof with guide rails, a chair arranged in said cylinder and provided with rollers engaging in the guide rails, certain of said rollers being shiftable laterally relative to the chair and provided on one side thereof with braking surfaces for engaging the guide rails in a manner to apply a braking action to the chair, and means for moving said certain rollers into frictional engagement with the guide rails including forks pivotally mounted on the chair and engageable with said rollers for shifting them, a lever plate pivotally mounted on the chair, link means operatively connecting the forks with the lever plate, a shaft rotatably mounted on the chair, link means operatively connecting the shaft with said lever plate, and means for securing the shaft in the desired position of rotative adjustment.

3. A seating structure for aeroplanes comprising a cylindrical casing having its edges bent to form opposed internal trackways provided with closed outer sides, respectively, a chair arranged in said casing, means for supporting said chair comprising pairs of opposed rollers rotatively mounted on said chair to run in said trackways, the rollers of one pair being laterally separable for frictional engagement with the closed sides of their respective trackways, a lever on one side of said chair adjustable into different set positions, and means operative by said lever to separate said separable roller in different degrees in different set positions of said lever, whereby variable braking pressures are selectively obtained between said separable rollers and their respective trackways, and including a rotary spreader, and operating connections between said spreader and separable rollers.

ROBERT C. MILLER.